United States Patent [19]
Nakamura et al.

[11] Patent Number: 4,980,660
[45] Date of Patent: Dec. 25, 1990

[54] ANTENNA SHARING APPARATUS FOR SWITCHABLE TRANSMIT/RECEIVE FILTERS

[75] Inventors: Toshiaki Nakamura, Nara; Hideyuki Miyake, Matsubara; Nobuhiro Takimoto, Osaka; Takashi Nagata, Ikeda, all of Japan

[73] Assignee: Matsushita Electric Industrial Co., Ltd., Osaka, Japan

[21] Appl. No.: 206,855

[22] PCT Filed: Oct. 5, 1987

[86] PCT No.: PCT/JP87/00741
§ 371 Date: Jun. 6, 1988
§ 102(e) Date: Jun. 6, 1988

[87] PCT Pub. No.: WO88/02559
PCT Pub. Date: Apr. 7, 1988

[30] Foreign Application Priority Data
Oct. 6, 1986 [JP] Japan .................................. 61-237332
Aug. 25, 1987 [JP] Japan .................................. 62-210495

[51] Int. Cl.$^5$ ........................ H03H 7/46; H01P 1/213; H04B 1/48
[52] U.S. Cl. ........................ 333/101; 333/132; 333/134; 333/207; 455/78; 455/82; 455/83; 370/38; 370/32
[58] Field of Search ............... 333/1, 101, 204, 205, 333/206, 207, 105, 106, 126, 129, 132, 134, 136; 455/78, 81–83, 306, 307; 370/25, 32, 38

[56] References Cited
U.S. PATENT DOCUMENTS
| | | | |
|---|---|---|---|
| 3,293,644 | 12/1966 | Loss et al. ................................. | 370/38 |
| 4,087,751 | 5/1978 | Kato et al. ........................... | 455/81 X |
| 4,349,799 | 9/1982 | Blocksome et al. .................. | 333/246 |
| 4,502,029 | 2/1985 | Reed ..................................... | 333/203 |

FOREIGN PATENT DOCUMENTS
| | | |
|---|---|---|
| 0041289 | 9/1981 | European Pat. Off. . |
| 5605 | 1/1985 | Japan . |
| 62201 | 4/1985 | Japan . |
| 260233 | 12/1985 | Japan .................................... 455/78 |
| 61-000003 | 6/1986 | Japan . |
| 141201 | 6/1986 | Japan . |
| 154201 | 7/1986 | Japan . |
| 214625 | 9/1986 | Japan .................................... 455/83 |
| 474948 | 10/1975 | U.S.S.R. ................................ 455/78 |
| 1123071 | 11/1984 | U.S.S.R. ............................... 333/101 |
| 2165098 | 3/1986 | United Kingdom . |

OTHER PUBLICATIONS
"Patent Abstracts of Japan," vol. 9, No. 165, (E-327) [1888], Jul. 10, 1985.
*Communication News,* vol. 12, No. 12, Dec. 1951; D. J. Braak: "Mobile Radio Equipment, Type SRR 178," pp. 57–67.

*Primary Examiner*—Benny T. Lee
*Attorney, Agent, or Firm*—Spencer & Frank

[57] ABSTRACT

Antenna sharing device used for a communications system such as a land mobile radiotelephone which has a transmitting frequency and a receiving frequency that are different from each other, and which commonly uses the antenna transmission and reception. The bands of transmission and reception of the antenna sharing device are each divided into half and are switched into a pair of sending side low-pass filter and a receiving side low-pass filter and a pair of sending side high-pass filter and a receiving side high-pass filter by a switching device, whereby the band widths of transmission and reception are narrowed and the isolation point is increased between the transmission and reception.

5 Claims, 6 Drawing Sheets

FIG. I
PRIOR ART
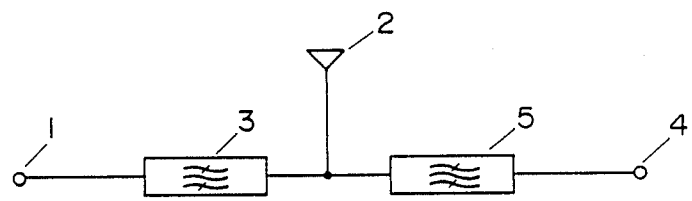
FIG. 2
PRIOR ART
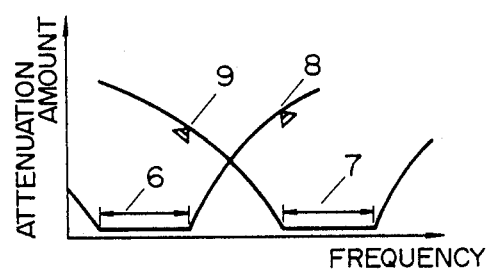

ANTENNA SHARING APPARATUS FOR SWITCHABLE TRANSMIT/RECEIVE FILTERS

BACKGROUND OF THE INVENTION

TECHNICAL FIELD

The present invention relates to an antenna sharing apparatus for use in a communication system, for example, an automobile telephone or the like in which the transmitting frequency and receiving frequency are different and which uses an antenna in common with the transmission and the reception.

BACKGROUND ART

As shown in FIG. 1, a conventional antenna sharing apparatus comprises a combination of two band pass filters. That is, a transmitting filter 3 for passing a transmission band is provided between a transmitting terminal 1 and an antenna terminal 2. A receiving filter 5 or passing a reception band is provided between a receiving terminal 4 and the antenna terminal 2. FIG. 2 shows transmitting characteristics of the conventional antenna sharing apparatus. A transmission band 6 and a reception band 7 are provided. The isolation in the reception band 7 of the transmission band 6 is indicated by a point 8. The isolation in the transmission band 6 of the reception band 7 is indicated by a point 9.

In the conventional antenna sharing apparatus, in the case where the transmission band 6 and reception band 7 are wide or where the transmission band 6 and reception band 7 are close to each other, it is difficult to set the transmission and reception isolation with large isolation points 8 and 9. And, when the transmission and reception bands are adjacent to each other, transmission and reception isolations cannot be obtained.

SUMMARY OF THE INVENTION

According to the invention, an antenna sharing apparatus comprises a combination of two or more filters and is constituted such that the pass bands of the filters are switched by switching means. Therefore, each of the transmission and reception bands of the antenna sharing apparatus are divided into halves and the transmission side low band, transmission side high band, reception side low band, and reception side high band are switched by the switching means, so that the transmission and reception band widths can be narrowed. An antenna sharing apparatus which can easily obtain large-transmission/reception-isolation points is thereby provided.

BRIEF DESCRIPTION OF THE DRAWINGS

FIG. 1 is a block diagram of a conventional antenna sharing apparatus, FIG. 2 is a transmission characteristic diagram of the conventional antenna sharing apparatus.

DETAILED DESCRIPTION OF THE PREFERRED EMBODIMENT

Figure 3:
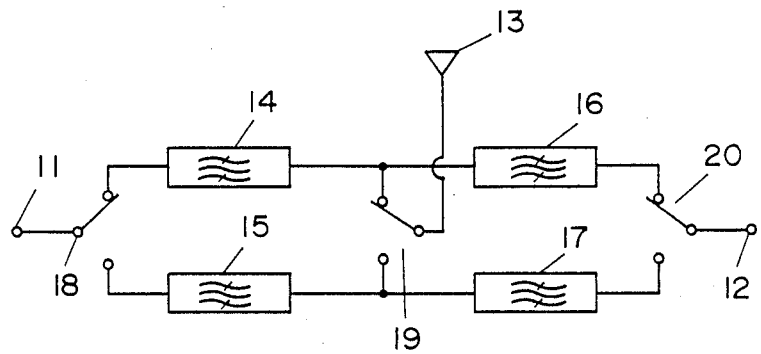
FIG. 3 is a block diagram of an antenna sharing apparatus in an embodiment of the present invention.

A block diagram of an antenna sharing apparatus in an embodiment of the present invention is shown in FIG. 3. A transmitting terminal 11 is connected to a transmission side low pass filter 14 and to a transmission side high pass filter 15 through a transmission side switch 18. The other terminals of the filters 14 and 15 are connected to an antenna side switch 19. Similarly, a receiving terminal 12 is connected to a reception side low pass filter 16 and to a reception side high pass filter 17 through a reception side switch 20. The other terminals of the filters 16 and 17 are connected to the antenna side switch 19. The antenna side switch 19 is connected to an antenna 13. In such an arrangement, the high band and low band filters 14, 15, 16, and 17 for transmission and reception are switched by the switches 18, 19, and 20. As the switches, it is possible to use either electrical switches using PIN diodes or mechanical switches using relays. In general, when a high output is transmitted, the mechanical switches using the relays are advantageous. Since the PIN diodes are saturated by a high output, they are improper for use in high output switches.

Figure 4:
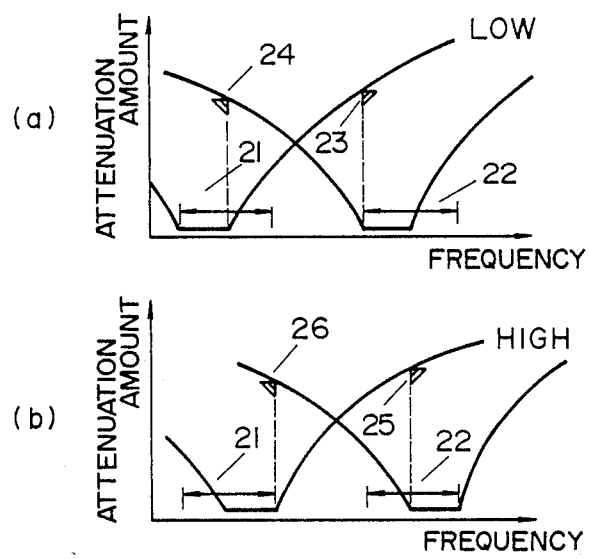
FIGS. 4a and 4b are transmission characteristic diagrams of the antenna sharing apparatus of FIG. 3.

The transmitting characteristics of the respective low and high bands of the antenna sharing apparatus in this embodiment are shown in FIGS. 4a and 4b.

As shown in FIG. 4a and 4b, a transmission band 21 and a reception band 22 are respectively divided into halves including a high band and a low band, thereby obtaining large isolations for transmission and reception. Namely, the transmission and reception isolation points are respectively set to transmission and reception isolation points 23 and 24 in the case of the low band and to transmission and reception isolation points 25 and 26 in the case of the high band. The isolation points are thereby shifted so as to go away from the band edges of the bands depending on whether the low band or the high band is selected. Therefore, even in the case of wide bands or where the transmission and reception bands are adjacent to each other, the transmission and reception isolation can be assured.

Figure 5:
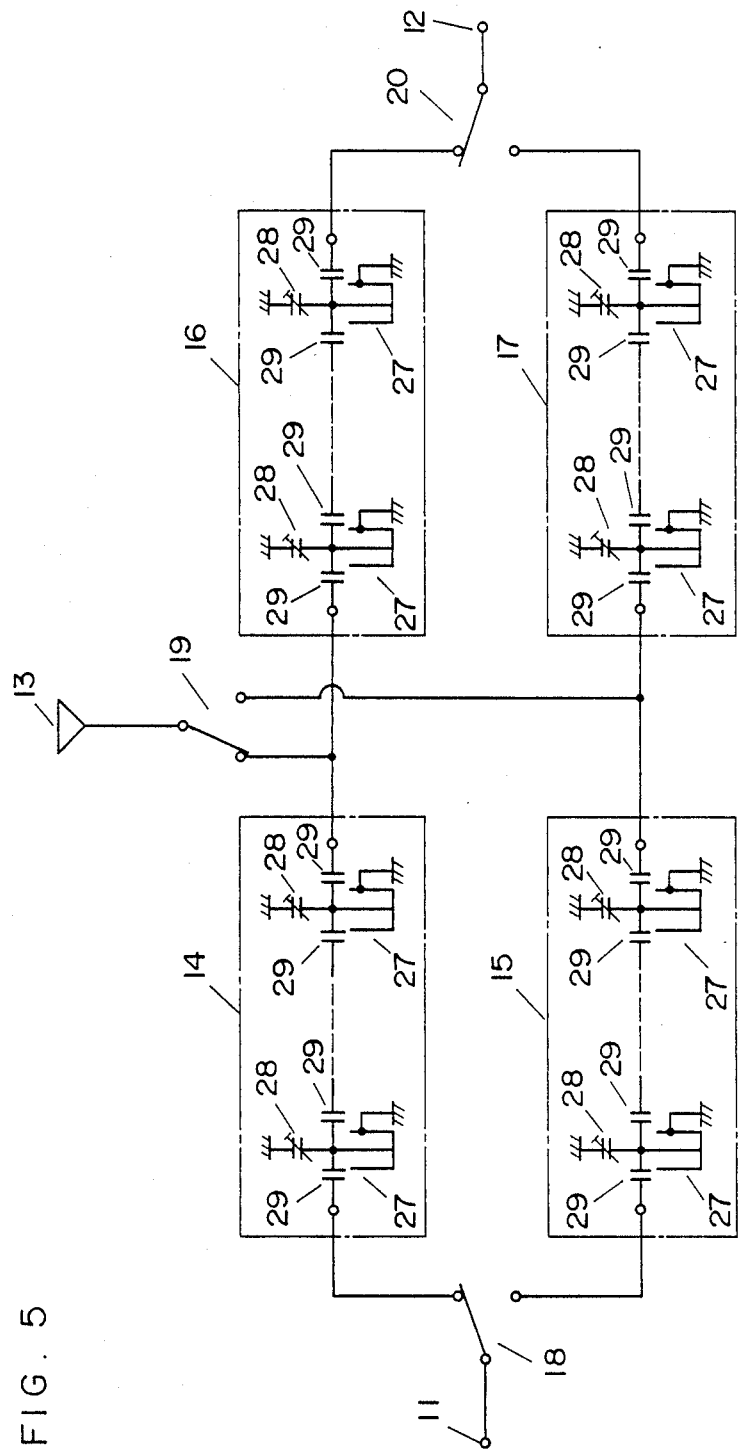
FIG. 5 is an electric circuit diagram showing a practical example of the antenna sharing apparatus of FIG. 3.

FIG. 5 is a circuit diagram showing a practical example of the antenna sharing apparatus according to the embodiment. Each of the filters 14 to 17 is constituted such that a plurality of dielectric coaxial resonators 27 of $\frac{1}{4} \lambda$ type having a variable capacitor 28 are connected through a coupling capacitor 29.

In such an arrangement, the characteristics of the dielectric coaxial resonators 27 are set and adjusted by the variable capacitor 28 so as to satisfy the characteristics of the filters 14 to 17.

Figure 6:
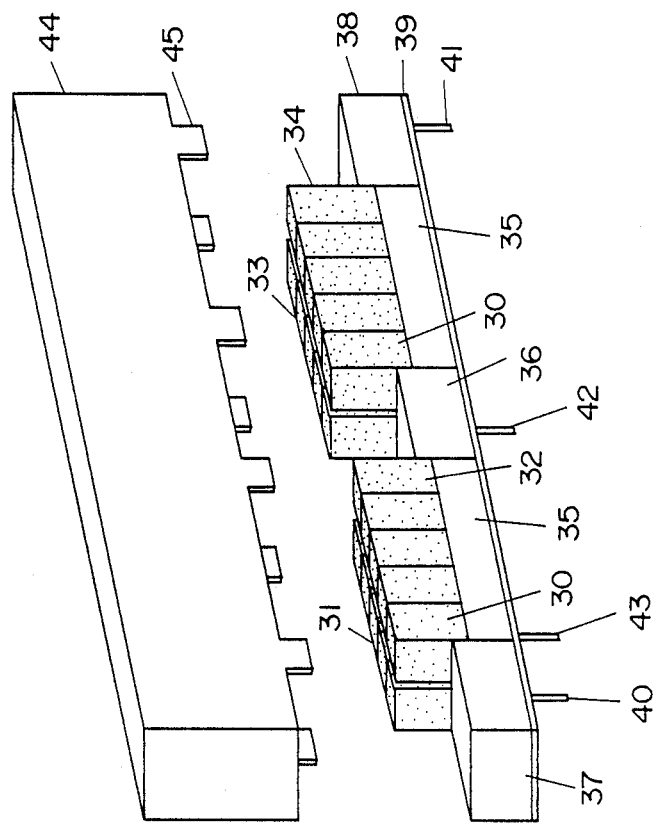
FIG. 6 is an exploded perspective view showing a practical filter structure.

A practical structure of the antenna sharing apparatus of the circuit shown in FIG. 5 is shown in FIG. 6. In FIG. 6, reference numeral 30 denotes dielectric coaxial resonators of the $\frac{1}{4} \lambda$ type. Every five dielectric coaxial resonators 30 constitute one block and are arranged together, thereby constituting a transmission side high pass filter section 31, a transmission side low pass filter section 32, a reception side high pass filter section 33, and a reception side low pass filter section 34. Reference numeral 35 denotes a filter casing to enclose the filter sections 31 to 34 comprising the dielectric coaxial resonators 30.

For the filter sections 31 to 34, the transmission side high pass filter section 31 and transmission side low pass filter section 32 constitute one block. And, the reception side high pass filter section 33 and reception side low pass filter section 34 constitute one block and are arranged adjacent to the block on the transmission side. A relay 36 serving as a switch on the antenna side is arranged between the transmission and reception side blocks. In this state, those filter sections are attached on a printed board 39. And, on the printed board 39, a relay 37 serving as a switch on the transmission side is attached to the edge portion adjacent to the transmission side block. Further, a relay 38 serving as a reception side switch is attached to the edge portion adjacent to the reception side block. And, the printed board 39 is provided with a transmitting terminal 40, a receiving terminal 41, an antenna terminal 42 serving as a connecting portion to the antenna, and a relay power source terminal 43 to apply a voltage to drive the relays 36, 37, and 38.

The respective parts attached on the printed board 39 are enclosed in a casing 44 made of metal. The casing 44 has an earth terminal 45.

Figure 7:
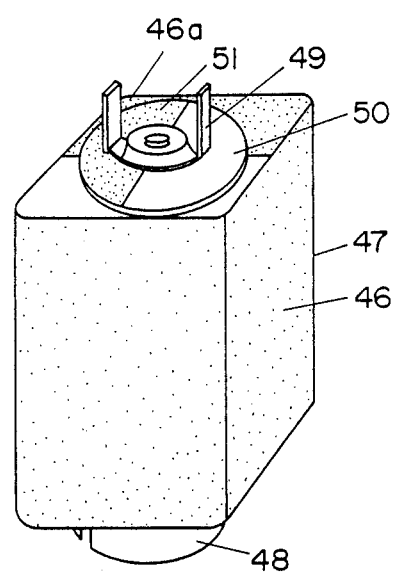
FIG. 7 is a perspective view showing a dielectric coaxial resonator used in the antenna sharing apparatus of the invention.
Figure 8:
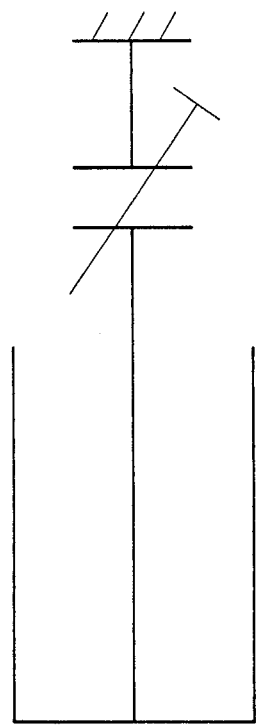
FIG. 8 is an equivalent circuit diagram of the dielectric coaxial resonator.

FIG. 7 shows an external shape of the dielectric coaxial resonator 30 and FIG. 8 shows its equivalent circuit.

In FIG. 7, there is shown a structure such that an electrode 46 is continuously formed on an inner peripheral surface, an outer peripheral surface, and one end surface of a cylindrical resonator main unit 47 and a rotor 50 which is rotatably supported by a shaft 48 and a spring 49 is arranged to the remaining end surface of the resonator main unit 47. The rotor 50 has a rotor electrode 51. A variable capacitor is constituted by the rotor electrode 51 which faces through the rotor 50 and an electrode 46a of the end surface of the resonator main unit 47.

In this embodiment, the filters themselves are switched by a switch. However, the resonant frequencies of the resonant elements constituting the filters may be also changed by tuning of the elements so that the high and low bands can be switched.

The dielectric coaxial resonator 27 shows in FIG. 5 is shown by an equivalent circuit in FIG. 8. As shown in FIG. 8, a variable capacitor (unnumbered) is connected between a ground terminal and an open end of a dielectric coaxial resonator (unnumbered). The dielectric coaxial resonator can, for example, be composed of the electrode 46 and the resonator main unit 47 which are shown in FIG. 7.

An embodiment in the case will now be described hereinbelow.

Figure 9:
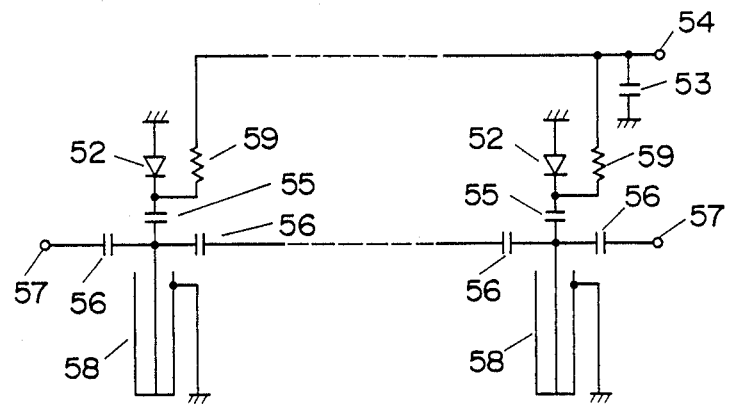
FIG. 9 is a circuit diagram showing an embodiment of a circuit using a varactor diode as a filter for use in the antenna sharing apparatus.

FIG. 9 is a circuit diagram of an embodiment of a voltage controlled filter using a varactor diode. Reference numeral 52 denotes a varactor diode; 53 is a by-pass capacitor; 54 a voltage control terminal; 55 a capacitor which is arranged serially with the varactor diode 52; 56 a coupling capacitor; 57 an input/output terminal; 58 a dielectric coaxial resonator of the $\frac{1}{4} \lambda$ type; and 59 a voltage controlling bias resistor. A voltage is applied to the voltage control terminal 54. A reverse voltage is applied to the varactor diode 52 through the voltage controlling bias resistor 59 to cause change in capacitance of the varactor diode 52. The resonant frequency of the resonator is changed. In this manner, the center frequency of the filter is changed. In this circuit, the deterioration due to insertion loss is small because a resonator having a high Q (quality factor) is used in the resonant system.

Figure 10:
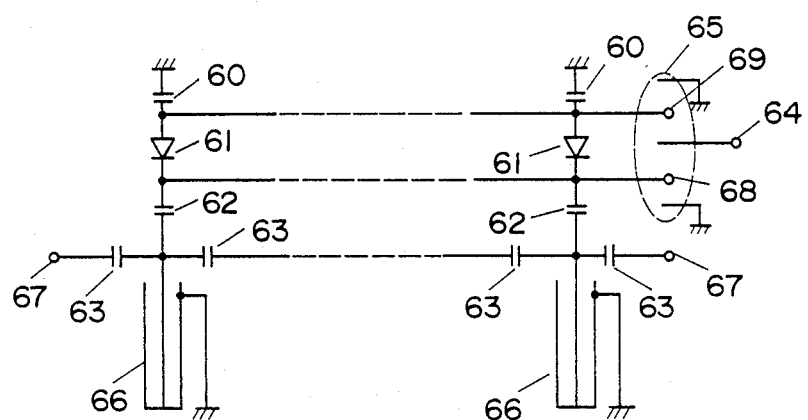
FIG. 10 is a circuit diagram of an embodiment of the circuit using a PIN diode as a filter.

FIG. 10 shows a circuit diagram of an embodiment of a voltage controlled filter using a PIN diode. Reference numeral 60 denotes a by-pass capacitor; 61 a PIN diode; 62 a switching capacitor; 63 a coupling capacitor; 64 a PIN diode biassing power source terminal; 65 a 3-terminal switch; 66 a dielectric coaxial resonator; 67 an input/output terminal; 68 a switch OFF terminal; and 69 a switch ON terminal. In the 3-terminal switch 65, when the switch OFF terminal 68 is set to ON, the switch ON terminal 69 is grounded and at this time, a reverse bias is applied to the PIN diode 61 and the switching capacitor 62 is not grounded. On the contrary, when the switch ON terminal 69 is set to ON, the switch OFF terminal 68 is grounded and at this time, the switching capacitor 62 is grounded through the bias resistor 60 and PIN diode 61. In this case, the resonant frequency of the dielectric coaxial resonator 66 changes (to a lower frequency) and the center frequency of the filter changes. In this circuit, the filter frequency can be switched to the center frequency of only either one of the high band side and the low band side. However, since the resonator can be constituted so as to have a higher Q as compared with the circuit using the varactor diode, the filter insertion loss is reduced. On the other hand, since the capacitance change in the diode is not used, the embodiment can be also used with a high electric power.

In radio communication or the like having a wide band, many stages of resonators are arranged to obtain attenuation amounts out of bands.

However, according to this filter, since the band width of the filter can be reduced into half, a desired attenuation amount out of the band can be obtained without arranging many stages of resonators. The small-sized and inexpensive wide-band filter according to the invention can be realized without a large deterioration in the performance. In addition, a temperature drift can be also made small.

We claim:

1. An antenna sharing apparatus comprising a transmission side filter and a reception side filter for connection to an antenna, transmission side switching means for connecting a transmitting terminal with said transmission side filter; reception side switching means for connecting a receiving terminal with said reception side filter; said transmission side filter comprising a transmission side high pass filter and a transmission side low pass filter which have respective input ends which are each selectively connectable to said transmitting terminal through said transmission side switching means; said reception side filter comprising a reception side high pass filter and a reception side low pass filter which have respective output ends which are each selectively connectable to said receiving terminal through said reception side switching means; said transmission side high pass filter and said transmission side low pass filter having respective output ends which are selectively connectable to said antenna through antenna side switching means, said reception side high pass filter and said reception side low pass filter having respective input ends which are selectively connectable to said antenna through said antenna side switching means; whereby in a first switched configuration said antenna side switching means connects said transmission side high pass filter and said reception side high pass filter to said antenna, said transmission side switching means connects said transmission side high pass filter with said transmitting terminal, and said reception side switching means connects said reception side high pass filter with said receiving terminal; and in a second switched configuration said antenna side switching means connects said transmission side low pass filter and said reception side low pass filter to said antenna, said transmission side switching means connects said transmission side low pass filter with said transmitting terminal, and said reception side switching means connects said reception side low pass filter with said receiving terminal.

2. An antenna sharing apparatus according to claim 1, wherein each respective one of said filters comprises a connection of a plurality of dielectric coaxial resonators of $\frac{1}{4} \lambda$ type, said resonators being respectively connected to a capacitor and a PIN diode, thereby changing the resonant frequency of said respective one of said filters by switching of said diode.

3. An antenna sharing apparatus according to claim 1, wherein said transmission side high pass and low pass filters comprise a transmission side block; said reception side high pass and low pass filters comprise a reception side block; and said apparatus further comprising a casing enclosing said transmission side block, said reception side block, and said antenna side switching means such that said antenna side switching means is disposed between said transmission side block and said reception side block.

4. An antenna sharing apparatus according to claim 1, wherein each of said filters comprises a capacitor, a varactor diode, and a plurality of connected dielectric coaxial resonators $\frac{1}{4} \lambda$ type, each of said resonators being respectively connected to said capacitor and to said varactor diode, whereby a change in capacitance of said varactor diode results in a change in the resonant frequency of the corresponding one of said filters by a change in capacitance of said diode.

5. An antenna sharing apparatus comprising a transmission side filter and a reception side filter for connection to an antenna; said transmission side filter comprising a plurality of transmission side filters having respective input ends which are connected to a transmitting terminal through transmission side switching means, said plurality of transmission side filters including at least a first high pass filter and a first low pass filter; said reception side filter comprising a plurality of reception side filters having respective output ends which are connected to a receiving terminal through reception side switching means, said plurality of reception side filters including at least a second high pass filter and a second low pass filter; and antenna side switching means, each of said plurality of transmission side filters having output ends which are selectively connectable to said antenna through said antenna side switching means, said reception side filters having input ends which are selectively connectable to said antenna through said antenna side switching means; whereby in a first switched configuration said antenna side switching means connects said first high pass filter and said second high pass filter to said antenna, said transmission side switching means connects said first high pass filter with said transmitting terminal, and said reception side switching means connects said second high pass filter with said receiving terminal; in a second switched configuration said antenna side switching means connects said first low pass filter and said second low pass filter to said antenna, said transmission side switching means connects said first low pass filter with said transmitting terminal, and said reception side switching means connects said second low pass filter with said receiving terminal; and wherein each of said plurality of transmission side filters, said plurality of reception side filters, and said antenna side switching means are enclosed in a casing.

* * * * *